US010686977B2

(12) United States Patent
Yen et al.

(10) Patent No.: US 10,686,977 B2
(45) Date of Patent: Jun. 16, 2020

(54) IMAGE CONTROL SYSTEM AND APPARATUS FOR INDUSTRIAL EMBEDDED SYSTEM

(71) Applicant: ATEN International Co., Ltd., New Taipei (TW)

(72) Inventors: Shih-Chieh Yen, New Taipei (TW); Hong-Tao Wen, Delta (CA)

(73) Assignee: ATEN International Co., Ltd., New Taipei (TW)

( * ) Notice: Subject to any disclaimer, the term of this patent is extended or adjusted under 35 U.S.C. 154(b) by 205 days.

(21) Appl. No.: 15/604,594

(22) Filed: May 24, 2017

(65) Prior Publication Data
US 2017/0347011 A1 Nov. 30, 2017

(30) Foreign Application Priority Data
May 25, 2016 (TW) .............................. 105207740 U

(51) Int. Cl.
H04N 5/00 (2011.01)
H04N 5/232 (2006.01)
G06T 3/40 (2006.01)
H04N 7/01 (2006.01)
H04N 7/18 (2006.01)

(52) U.S. Cl.
CPC ........... *H04N 5/23206* (2013.01); *G06T 3/40* (2013.01); *H04N 7/0117* (2013.01); *H04N 7/0127* (2013.01); *H04N 7/183* (2013.01); *G05B 2219/37572* (2013.01); *H04N 5/23229* (2013.01); *H04N 7/01* (2013.01)

(58) Field of Classification Search
CPC ............... H04N 5/00; H04N 7/00; G06F 3/00
See application file for complete search history.

(56) References Cited

U.S. PATENT DOCUMENTS

| 7,984,195 | B2 | 7/2011 | Jackson | |
|---|---|---|---|---|
| 2008/0020354 | A1* | 1/2008 | Goree | ...................... F41A 17/06 434/11 |
| 2017/0272316 | A1* | 9/2017 | Johnson | ................ H04L 61/301 |

FOREIGN PATENT DOCUMENTS

| CN | 101426132 A | 5/2009 |
|---|---|---|
| CN | 201689403 U | 12/2010 |
| TW | M310382 U | 4/2007 |

OTHER PUBLICATIONS

Chinese Office Action, dated Oct. 21, 2019, and Search Report dated Oct. 10, 2019, in a counterpart Chinese patent application, No. CN 201610581815.2.

* cited by examiner

*Primary Examiner* — Maryam A Nasri
(74) *Attorney, Agent, or Firm* — Chen Yoshimura LLP

(57) ABSTRACT

The utility model provides system and apparatus for communication between different interfaces. The system includes at least an image process module for processing at least an image signal produced from a least an industrial embedded system, a remote control module coupled to at least said image process module for receiving said processed image signal and transmitting it to a remote computer, wherein said remote control module further receiving a control command of said remote computer, and at least a control module coupled to said remote module for receiving and processing said command.

13 Claims, 6 Drawing Sheets

IMAGE CONTROL SYSTEM AND APPARATUS FOR INDUSTRIAL EMBEDDED SYSTEM

BACKGROUND OF THE INVENTION

Field of the Invention

This invention relates to an image control device and system, and in particular, it relates to an image control device and system for industrial embedded systems.

Description of Related Art

With industrialization, industrial manufacturing became the wave of global industrial economies. Production lines and facilities for electronic products based on intensive labor and technologies can enable fast manufacturing of electronic products. Due to change in cost of labor, many manufacturers have more widely introduced automated production lines. Further, many different technologies may be used to speed up the production processes. For example, surface mount technology (SMT), which is a technology that mounts electronics components on the surface of printed circuit boards (PCB), can make electronic products more compact and light weight. This technology can produce high end products and is also suitable for mass production, therefore saving labor and processing time.

Automatic production lines coupled with new technologies result in various types of new production apparatus and testing apparatus. For example, in a production line for electronic products, to employ SMT process, many production apparatus are required, such as stamping machines, mounting machine, etc. Meanwhile, to reduce the labor required for product testing, various testing apparatus are developed, such as optical testing devices, electrical testing devices, etc. With the introduction of automated production lines into production planning, the labor requirements are greatly reduced. With the introduction of automated production lines into production planning, although production lines can be coordinated and integrated with standard rules and processing flow, in practice, human operators are still needed to monitor the operation condition of the production machines, or to monitor and set the testing apparatus. Therefore, the information and data generated during production still need to be established manually by the human operator; in particular, the updating frequency and data accuracy for key statistical data of production are often not perfect.

To truly and comprehensively establish automated production, more attention is being paid to the information systems and control systems for production line operations. For example, programmable logic controllers (PLCs), which are compact in size and are easy to control, are often used for control systems of production machines. For example, the movement of the mechanical arms of a machine, opening and closing of doors or the produce ingress-egress gates can all be controlled by PLC. In other examples, embedded systems, industrial computers (industrial controllers) and other industrial control devices not only have regular control function, but also have image monitoring functions which can display actual images or machine operation process on display screens.

Mass deployment of these programmable industrial control devices or system can effectively achieve automated processing and production. However, in current industrial production lines, it is still difficult to integrate all apparatus to apply centralized control in order to realize automation of the entire production process. One reason for this is because the control systems used in industrial production lines do not have standard image output ports such as VGA (Video Graphics Array), DVI (Digital Visual Interface), HDMI (High-Definition Multimedia Interface), etc. Moreover, the output image signals often have different image resolutions or a wide range of signal timing, so it is difficult to use switching devices such as keyboard, video, mouse (KVM) switches to realize centralized control of all apparatus.

On the other hand, for a current industrial production line, it is typical to use apparatus manufactured by different manufacturers. Control systems manufactured by different manufactures use their own information systems or management systems, making it very difficult to centrally manage and control apparatus manufactured by different manufactures. Further, even for apparatus manufactured by the same manufacturer, if some apparatus use high end systems such as computers while other apparatus use simpler devices controllers as control system, they often have incompatible signal specifications, which can also cause difficulties for centralized control of production lines.

To achieve centralized control of production apparatus, software methods may be used. A known method is to use a remote control device to monitor and manage all control systems of the apparatus. For example, a remote control computer is set up for a user, and via a network, it is connected to all industrial computers that use the same operating system and the same server monitor program to manage and control them. However, this method is still limited by the above described problems; to use this method, all apparatus need to be equipped with and execute the same control program and need to have the same level of processor or control system, such as industrial computers. In other words, the know technology cannot perform central control of control systems of different specifications.

In summary, to improve the known technologies, and taking into considering production cost and process flow of automated production, embodiments of the present invention provide an image control device for industrial embedded systems, characterized by providing a method that solves the problem that the signals output by control systems of different levels have different specifications, in order to achieve image control.

SUMMARY

Embodiments of the present invention provide a solution to the above-described problems of the conventional control systems. An object of the present invention is to provide an image control device for industrial embedded systems, which overcomes the problem of lack of centralized control in conventional production line control systems. Thus, the image control device according to embodiments of the present invention is suitable for different control systems, such as embedded systems, programmable logic controllers, industrial computers and industrial controllers. It is not limited by the different specifications of the output signals, and can convert the signals and centrally manage and control them. It can also expand the images, effectively solving the problem of lack of centralized control of all apparatus of a production line.

To achieve the above objects, the present invention provides an image control device for industrial embedded systems, which includes: at least one video processing module, for processing an image signal generated by at least one industrial embedded system; a remote control module, coupled to the at least one video processing module, for receiving processed image signal and transmitting it to a remote computer, wherein the remote control module further receives a control command from the remote computer; and at least one control processing module, coupled to the remote control module, for receiving and processing the control command.

To achieve the above objects, the at least one video processing module includes a video capture device and a video scaler, for performing timing adjustment and resolution adjustment of the image signal.

To achieve the above objects, the at least one video processing module includes a video compression engine for compressing the image signal.

To achieve the above objects, the device further includes a digital to analog converter, wherein after at least one of resolution and timing is adjusted by the video capture device and the video scaler, the digital to analog converter converts the image signal and outputs a standard image signal to achieve image expansion.

To achieve the above objects, the device further includes a memory module for storing the processed image signal, the memory module including at least one memory controller and a memory, for storing setting commands for image processing and image processing results.

To achieve the above objects, the image signal generated by the industrial embedded system is a signal of an operation screen, and the signal of the operation screen is transmitted to a display panel.

Another object of the present invention is to provide an image control system for industrial embedded systems, which overcomes the problem of lack of centralized control in conventional production line control systems. Thus, the image control system according to embodiments of the present invention is suitable for different control systems, such as embedded systems, programmable logic controllers, industrial computers and industrial controllers. It is not limited by the different specifications of the output signals, and can convert the signals and centrally manage and control them. It can also expand the images, effectively solving the problem of lack of centralized control of all apparatus of a production line.

To achieve the above objects, the present invention provides an image control system for industrial embedded systems, which includes: a router and at least one industrial embedded system, the at least one industrial embedded system being coupled to the router; the at least one industrial embedded system including: at least one video processing module, for processing an image signal generated by the at least one industrial embedded system; a remote control module, coupled to the at least one video processing module, for receiving processed image signal and transmitting it to the router, wherein the remote control module further receives a control command from the router; and at least one control processing module, coupled to the remote control module, for receiving and processing the control command; wherein the router aggregates the processed image signal from the at least one industrial embedded system and transmits it to a remote computer; and wherein the control command is transmitted form the remote computer to the router.

To achieve the above objects, the at least one video processing module includes a video capture device and a video scaler, for performing timing adjustment and resolution adjustment of the image signal.

To achieve the above objects, the at least one video processing module includes a video compression engine for compressing the image signal.

To achieve the above objects, the image control system further includes a digital to analog converter, wherein after at least one of resolution and timing is adjusted by the video capture device and the video scaler, the digital to analog converter converts the image signal and outputs a standard image signal to achieve image expansion.

To achieve the above objects, the industrial embedded system further includes a memory module for storing the processed image signal, the memory module including at least one memory controller and a memory, for storing setting commands for image processing and image processing results.

To achieve the above objects, the router is a network router.

To achieve the above objects, the image signal generated by the industrial embedded system is a signal of an operation screen, and wherein the signal of the operation screen is transmitted to a display panel.

Yet another object of the present invention is to provide an image control method for industrial embedded systems, which overcomes the problem of lack of centralized control in conventional production line control systems. Thus, the image control method according to embodiments of the present invention is suitable for different control systems, such as embedded systems, programmable logic controllers, industrial computers and industrial controllers. It is not limited by the different specifications of the output signals, and can convert the signals and centrally manage and control them. It can also expand the images, effectively solving the problem of lack of centralized control of all apparatus of a production line.

To achieve the above objects, the present invention provides an image control method for industrial embedded systems, which includes: by at least one video processing module, processing an image signal generated by at least one industrial embedded system and transmitting the processed image signal to a remote control module; by the remote control module, receiving the processed image signal and transmitting it to a remote computer; and by a control processing module, receiving a control command, wherein the at least one industrial embedded system executes the control command.

To achieve the above objects, the step of receiving the processed image signal and transmitting it to the remote computer by the remote control module includes: by the remote control module, transmitting the processed image signal to the remote computer via a router.

To achieve the above objects, the step of processing the image signal by the at least one video processing module includes: performing timing adjustment and resolution adjustment of the image signal.

To achieve the above objects, the step of processing the image signal by the at least one video processing module includes: compressing the image signal.

To achieve the above objects, the method further includes: after the at least one video processing module processes the image signal, outputting a standard image signal to achieve image expansion.

To achieve the above objects, the image signal generated by the industrial embedded system is a signal of an operation screen, and wherein the signal of the operation screen is transmitted to a display panel.

To achieve the above objects, the method further includes: after the remote computer transmits the control command to the at least one control processing module, the control processing module controlling the at least one video processing module to process the image.

To achieve the above objects, the processed image signal is transmitted to the remote computer via a network.

To achieve the above objects, the control command is transmitted from the remote computer to the remote control module via the network.

With reference to the drawings and the detailed descriptions below, the above aspects of the present invention and its advantages can be understood.

DETAILED DESCRIPTION OF PREFERRED EMBODIMENTS

Embodiments of the present invention and their various aspects are described in detail below. These descriptions provide implementation details to enable a full understanding. Those skilled in the relevant art will appreciate that the invention may be practiced without some of the details. Further, details of certain well known structures and functions are omitted. Moreover, terms used in the descriptions below should be given broadest reasonable interpretation, even though they are used in the context of specific embodiments of the invention.

Figure 1:
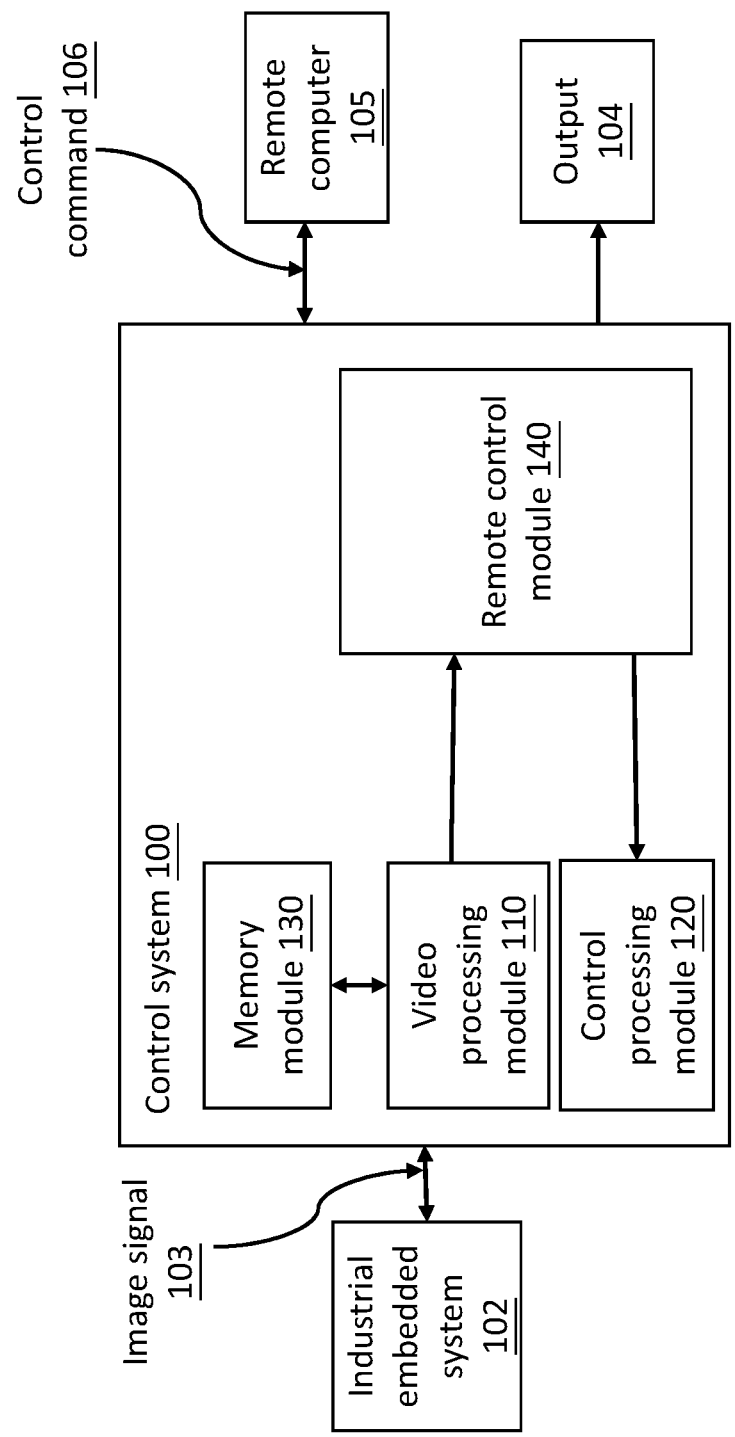
FIG. 1 is a block diagram showing the structure of an image control device for industrial embedded systems according to an embodiment of the present invention.

FIG. 1 is a block diagram showing the structure of an image control device for industrial embedded systems according to an embodiment of the present invention. It should be noted that this embodiment is useful for industrial embedded systems but is not limited to such systems, as it can also be used in industrial computers, industrial controllers, embedded industrial computers, embedded industrial controllers, programmable logic controllers (PLC), programmable automation controllers (PAC), etc. When needed it can be used in other industrial level controllers and industrial level embedded systems for various production apparatus or testing apparatus of production lines, depending on the need of actual production lines.

First Embodiment

Refer to FIG. 1, in a first embodiment, this invention provides a control device for industrial embedded system (hereinafter referred to as the control system 100), which includes: at least one video processing module 110, which processes an image signal 103 generate by at least one industrial embedded system 102; a remote control module 140, which is coupled to the at least one video processing module 110, and which receives the processed image signal 103 and transmits it to a remote computer 105, where the remote control module 140 further receives a control command 106 from the remote computer 105; and at least one control processing module 120 which is coupled to the remote control module 140 for receiving and processing the control command 106. The control system 100 further includes a memory module 130 coupled to the video processing module 110. In this disclosure, "image" typically refers to video images.

Referring to FIG. 1, in this embodiment, the industrial embedded system 102 may be an industrial computer, industrial controller, embedded industrial computer, embedded industrial controller, PLC, PAC, or another industrial level controller or industrial level embedded system for various production apparatus or testing apparatus of production lines, etc. The video processing module 110 of the control device 100 receives the image signal 103 generated by the industrial embedded system 102. The image signal 103 generated by the industrial embedded system 102 may be transmitted directly to a corresponding display screen to be displayed. In other words, the image signal 103 generated by the industrial embedded system 102 may be a signal of an operation screen, and the signal of the operation screen is transmitted to a display screen to be displayed.

Referring to FIG. 1, in one embodiment, the control device for industrial embedded system 100 is inserted in the transmission path (from the industrial embedded system to the display screen i.e. output 104) to manage and control the image. After the video processing module 110 receives the 103, it processes the image signal 103, and transmits the processed image signal 103 to the remote control module 140. It should be noted that the remote control module may be an Ethernet chip (Ethernet PHY). Finally the remote control module 140 transmits the processed image signal 103 via the network to the remote computer 105. Typically, the transmission network may be Ethernet, but it is not limited to such and can also be other wired or wireless networks typically used in industry or in general applications. The remote computer 105 is the main control computer; it may be a desktop computer, notebook computer or tablet computer. It manages and controls the image of the industrial embedded system 102 via the control device 100.

Referring to FIG. 1, in one embodiment, the user may use the remote computer 105 to set control commands 106 and transmit them to the remote control module 140 of the control device 100. Here, control commands 106 typically refer to any expressions of executable programs used in industrial production, and include all programing languages or compiled machine languages, which can be executed by the industrial embedded systems 102 or the industrial control systems, industrial controllers, and industrial computers to perform intended functions. The remote control module 140 of the control device 100 is coupled to the control processing module 120. The control processing module 120 is a module that includes processors, for receiving and processing control commands 106. As explained above, under this framework, the user may use the control device 100 to accomplish the function of controlling the industrial embedded systems 102.

Referring to FIG. 1, in one embodiment, the control device 100 further includes the control processing module 120 controlling the video processing module 110, i.e., after the control commands 106 from the remote computer 105 are transmitted to the control processing module 120, they can be used to control the video processing module 110 to perform image processing. Take the example of resolution adjustment, the image seen at the remote computer 105 may be one that has been aggregated by the router and displayed as a multi-image display having multiple images arranged in a grid. The low resolution and compression of the images make them suitable for one small image of the multi-image display, but when the user of the remote computer 105 discovers that the image corresponding to one of the industrial embedded systems 102 shows abnormality, the user may select a control command 106 and transmits it to the control device 100, to command the latter to adjust the image resolution and transmits the new image to the remote computer 105. This way, the user of the remote computer 105 can enlarge that image so that the user can observe the image more easily, more clearly and with more details.

Second Embodiment

Figure 2:
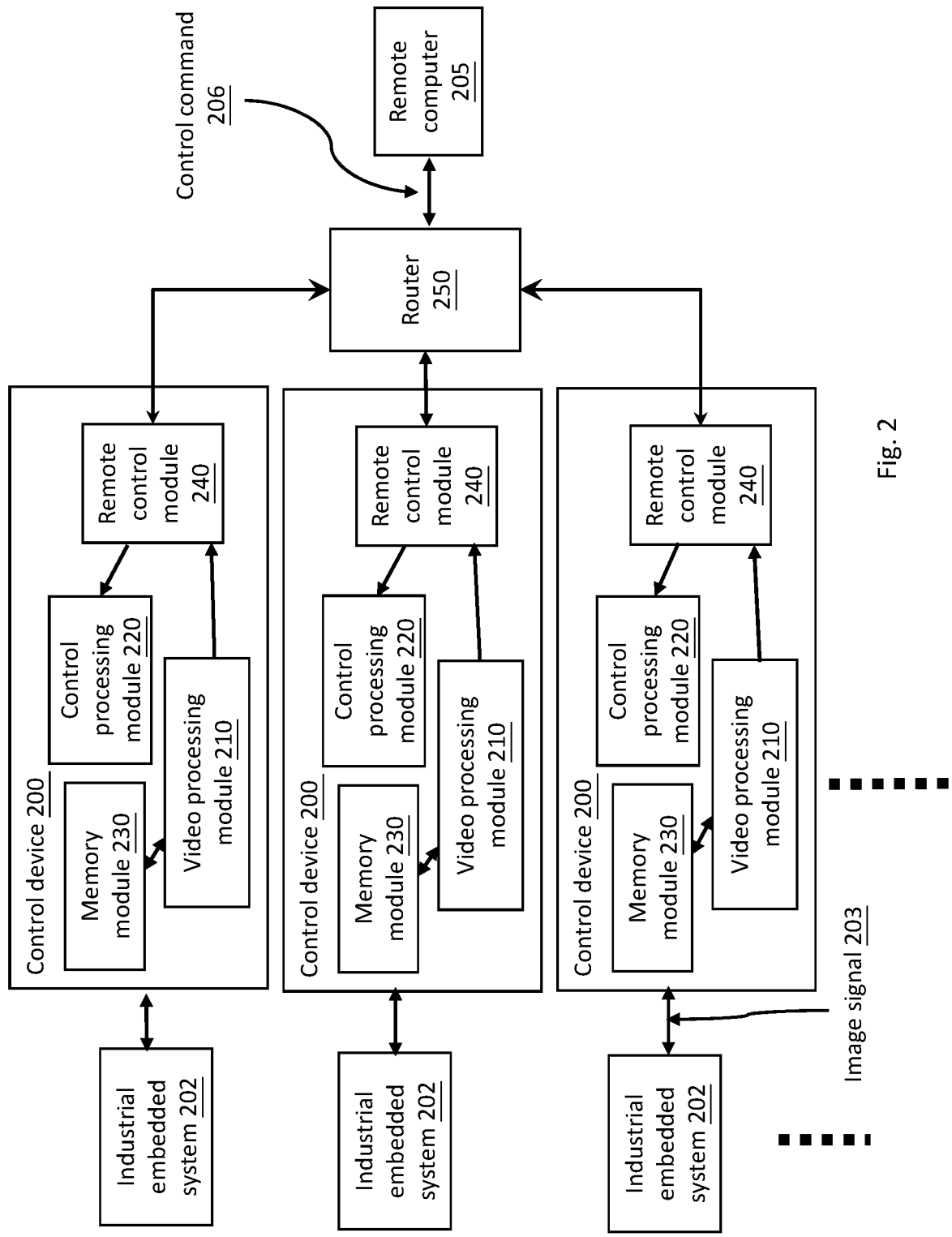
FIG. 2 is a block diagram showing another image control device for industrial embedded systems according to an embodiment of the present invention.

FIG. 2 is a block diagram showing another image control device for industrial embedded systems according to an embodiment of the present invention. Referring to FIG. 2, in one embodiment, if the industrial production line includes multiple industrial embedded systems 202 for multiple production apparatus or testing apparatus, the embodiment may be used to manage and control the multiple industrial embedded systems 202. Each video processing module 210 of the control device 200 receives the image signal 203 from the corresponding industrial embedded system 202. The video processing module 210 then processes the image signal 203, and transmits it to a remote control module 240. The remote control module 240 transmits the processed image signal 203 to the remote computer 205 via a network and router 250. It should be noted that the remote control module may be an Ethernet chip (Ethernet PHY). Typically, the transmission network may be, without limitation, the Ethernet, and may also be other wired or wireless networks typically used in industry or for general applications. It should be noted that here the term "router" is used broadly without limitation; the router 250 may be a routing controller, network router, switch, network switch, or any software and hardware-based device that has the function of a network router of any layer of the OSI model (Open System Interconnection Reference Model). Using this router, the processed image signals 203 from the multiple industrial embedded systems 202 may be transmitted to the remote computer 205 by the control device 200. The control device 200 further includes a memory module 230.

Referring to FIG. 2, in one embodiment, the router 250 transmits the processed image signals 203 to the remote computer 205. The remote computer 205 is the main control computer, and may include a desktop computer, notebook computer, tablet computer or other computing device. As explained above, via the control device 200 and the network, the remote computer 205 can achieve centralized control of images of multiple industrial embedded systems 202, so that under the framework of conventional industrial systems and other industrial control systems, the function of providing image management using the network (video over IP) is realized.

Referring to FIG. 2, in one embodiment, the user may use the remote computer 205 to set control commands 206 and transmit them to the remote control module 240 of the control device 200. Here, control commands 206 typically refer to any expressions of executable programs used in industrial production, and include all programing languages or compiled machine languages, which can be executed by the industrial embedded systems 202 or other industrial control systems, industrial controllers, and industrial computers to perform intended functions. The remote control module 240 of the control device 200 is coupled to the control processing module 220. The control processing module is a module that includes processors, for receiving and processing control commands 206. As described above, under this framework, the user may use the control device 200 to accomplish the function of controlling the industrial embedded systems 202.

Referring to FIG. 2, in one embodiment, the control device 200 further includes the control processing module 220 controlling the video processing module 210, i.e., after the control commands 206 from the remote computer 205 are transmitted to the control processing module 220, they can be used to control the video processing module 210 to perform image processing. Take the example of adjusting resolution, the image seen at the remote computer 205 may be one that has been aggregated by the router 250 and displayed as a multi-image display having multiple images arranged in a grid. The low resolution and compression of the images make them suitable for one small image of the multi-image display, but when the user of the remote computer 205 discovers that the image corresponding to one of the industrial embedded systems 202 indicates abnormality, the user may select a control command 206 and transmits it to the control device 200, to command the latter to adjust the image resolution and transmits the new image to the remote computer 205. This way, the user of the remote computer 205 can enlarge that image so that the user can observe the image more easily, more clearly and with more details.

Third Embodiment

Figure 3:
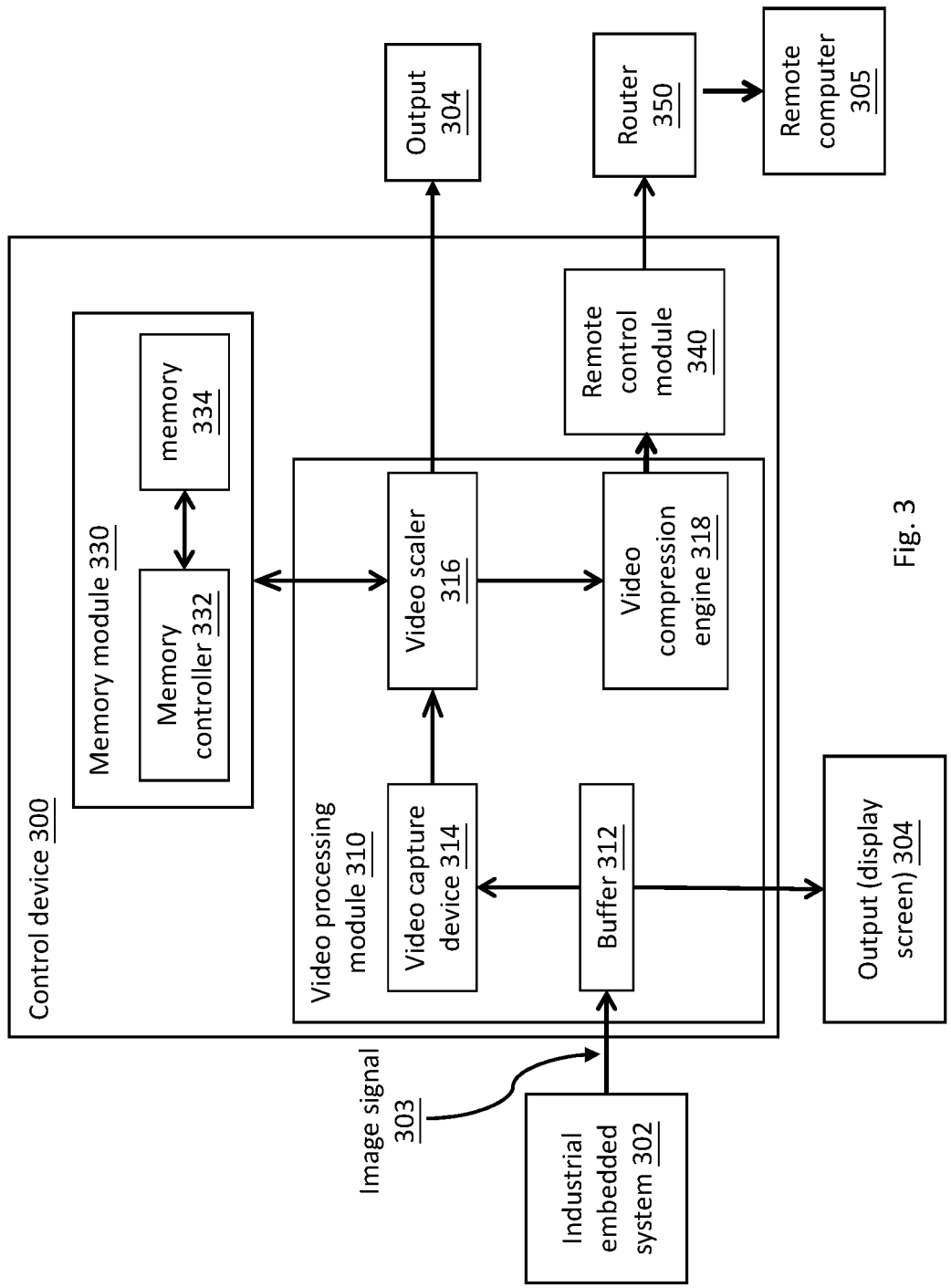
FIG. 3 illustrates image processing of an image control device for industrial embedded systems according to an embodiment of the present invention.

FIG. 3 illustrates image processing of an image control device for industrial embedded systems according to an embodiment of the present invention. In one embodiment, the industrial embedded system 302 transmits image signal 303 to the buffer 312 of the video processing module 310. Via the buffer 312, the image signal 303 can be directly output to the output 304 corresponding to the industrial embedded system 302, such as display panel, LCD (liquid crystal display) screen or touch screen display. It should be noted that the image signal 303 that are directly output from the buffer 312 has not undergone image processing, i.e., after installing the control device 300, the industrial embedded system 302 can maintain its original output path, and displays its images on the corresponding display device. Preferably or simultaneously, the image signal 303 is output from the buffer 312 and transmitted to the video capture device 314 and video scaler 316.

Referring to FIG. 3, in one embodiment, the image signal 303 is processed by the video capture device 314, where the video capture device 314 captures the image signal 303. After the video capture device 314 captures the video signal 303, the video scaler 316 is used to adjust the resolution of the processed video signal 303. The video scaler 316 is used to change the resolution to achieve resolution adjustment, such as adjusting the horizontal resolution or the vertical resolution. Typically the resolution is changed from a lower resolution to a higher resolution, or from a higher resolution to a lower resolution, so here the video scaler may be considered a video resolution adjusting device or video amplifier.

Referring to FIG. 3, in one embodiment, the image signal 303, after processing by the video capture device 314 and the video scaler 316, can now be output. A digital to analog converter (ADC) (which may be an external ADC) is used to covert the process image signal 303 from digital signal to analog signal, to produce a standard image signal to be transmitted to the output 304, such as a display panel, LCD screen or touch screen display, to achieve the function of image enlargement. Examples of the standard image signal include VGA, DVI, HDMI, etc. For example, the working image or processed image frame of the industrial embedded system 302 can be displayed on multiple display devices or transmitted to the remote end via the network, so that multiple users may simultaneously monitor the industrial embedded system 302.

Referring to FIG. 3, in one embodiment, the control device 300 includes a memory module 330, which includes a memory controller 332 and a memory 334, for storing processed image signal 303 and the setting commands for image processing. The memory controller controls the connection of the memory and the processor, and can greatly increase the read and write speed and performance between the memory and processor, or can store image processing setting values and setting commands set by the user.

Referring to FIG. 3, in one embodiment, preferably or simultaneously, the image signal 303, after being processed by the video capture device 314 and the video scaler 316, the image signal 303 can be simultaneously or selectively output as enlarged images and transmitted to the video compression engine 318. This embodiment has the effect of centralized control of multiple industrial embedded systems 302, so it is important to reduce the image transmission burden of each image; thus, by using the video compression engine 318 to compress the image signal 303, thereby reducing the amount of data to be transmitted, the burden on the transmission bandwidth of the network can be reduced.

Referring to FIG. 3, in one embodiment, finally, the remote control module 340 convers the compressed image data that has been compressed by the video compression engine 318. It should be noted that here the remote control module may be an Ethernet PHY. In one embodiment, after the video compression engine 318 processes the image signal 303, the processed image signal 303 is transmitted by the video processing module 310 to the remote control module 340, and then via the network, the image signal 303 is transmitted to a remote computer 305 via a router 350. Here, the transmission network may be the Ethernet, but is not limited to it, and can also be any wired or wireless network commonly used in industry or general applications. It should be noted that here the term "router" is used broadly without limitation; the router 350 may be a network router, switch, network switch, or any software and hardware-based device that has the function of a network router of any layer of the OSI model. Using the router 350, the multiple processed image signals 303 from multiple industrial embedded systems 302 may be transmitted to the remote computer 305 by the control device 300.

Referring to FIG. 3, in one embodiment, finally, the router 305 transmits the processed image signal 303 to the remote computer 305. The remote computer 305 is the main control computer; it may be a desktop computer, notebook computer or tablet computer or other computing devices having a processor or hardware decoder. As explained above, the remote computer 305 can centrally manage image signals 303 from multiple industrial embedded systems 302 via the control device 300, so that under the framework of conventional industrial systems and other industrial control systems, the function of providing image management using the network (video over IP) is realized.

Fourth Embodiment

Figure 4:
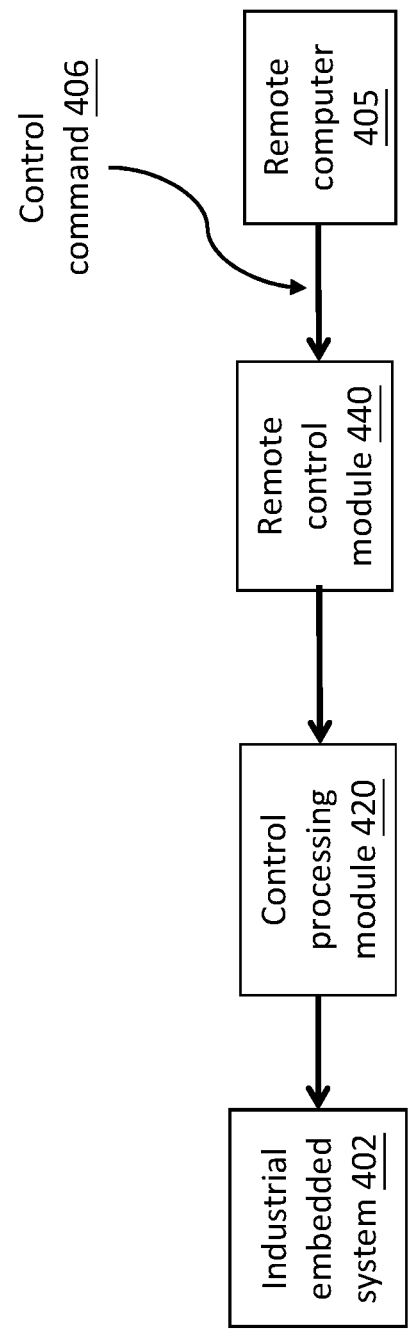
FIG. 4 illustrates signal control of an image control device for industrial embedded systems according to an embodiment of the present invention.

FIG. 4 illustrates signal control of an image control device for industrial embedded systems according to an embodiment of the present invention. The user may use the remote computer 405 to set control commands 406 and transmit them to the remote control module 440 of the control device 400. Here, control commands 406 typically refer to any expressions of executable programs used in industrial production, and include all programing languages or compiled machine languages, which can be executed by the industrial embedded systems 402 or the industrial control systems, industrial controllers, and industrial computers to perform intended functions. The remote control module 440 of the control device 400 is coupled to the control processing module 420, and can transmit control commands 406 to the control processing module 420 via the network. The transmission network may be, without limitation, the Ethernet, but it may also be other wired or wireless networks typically used in industry or for general applications. The control module is a module that includes a processor, such as a central processing unit (CPU); it is used to receive and process control commands 406 and then transmit them to control units of the industrial embedded systems 402 to execute various control processes. As explained above, under this framework, the user may use the control processing module 420 to accomplish the function of controlling the industrial embedded systems 402.

Fifth Embodiment

Figure 5:
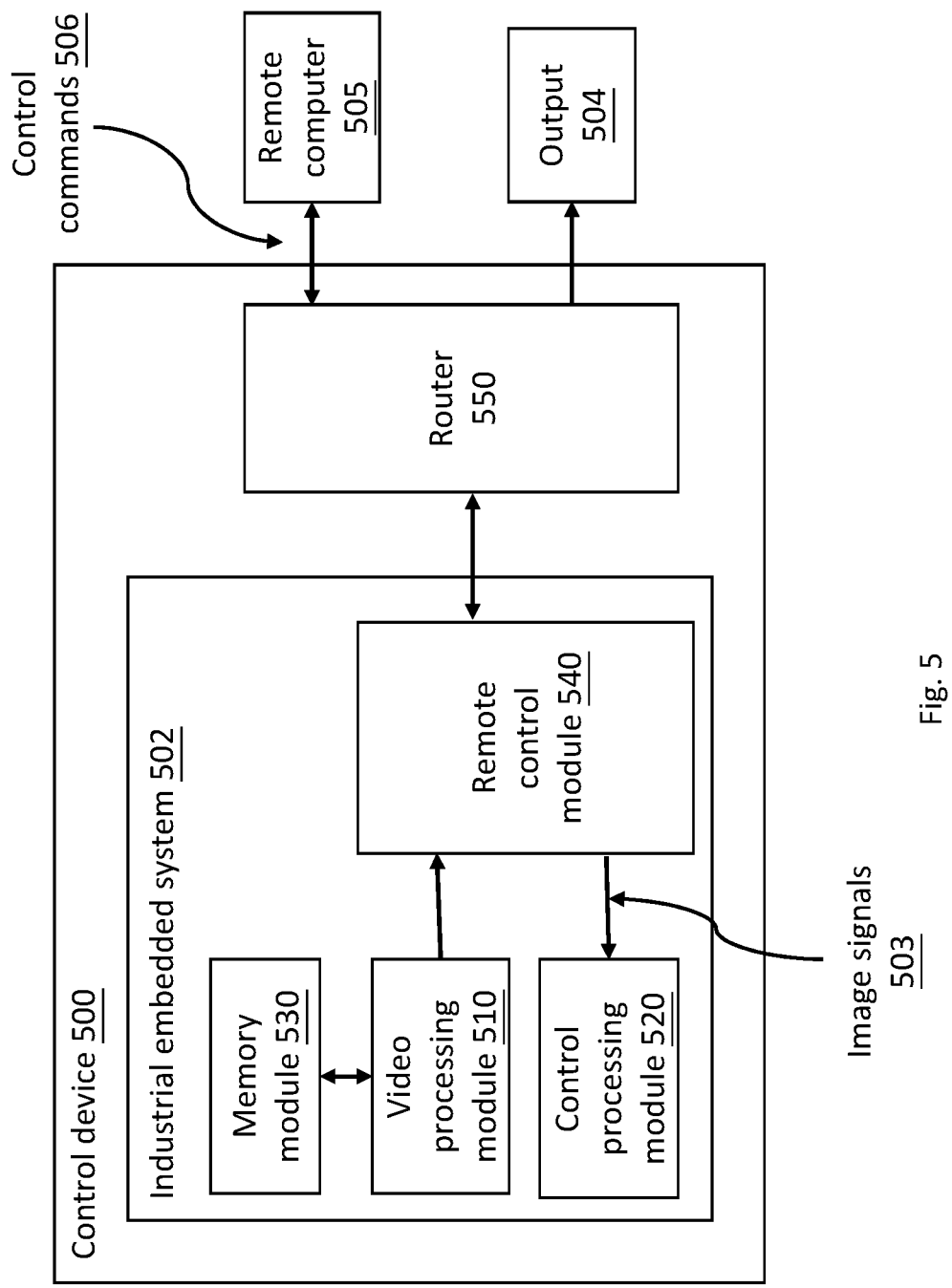
FIG. 5 is a block diagram showing the structure of an image control device for industrial embedded systems according to an embodiment of the present invention.

FIG. 5 is a block diagram showing an image control device for industrial embedded systems according to an embodiment of the present invention. Referring to FIG. 5, one embodiment of the present invention provides a control device for industrial embedded system (hereinafter referred to as the control system 500), which includes: a router 550 and at least one industrial embedded system 502. The at least one industrial embedded system 502 includes: at least one video processing module 510, which processes an image signal 503 generate by the industrial embedded system 502; a remote control module 540, which is coupled to the at least one video processing module 510 and receives the processed image signal 503 and transmits it to the router 550; the remote control module 540 further receiving a control command from the router 550; at least one control processing module 520 which is coupled to the remote control module 540 and receives the control command 506. The router aggregates the processed image signals 503 transmitted from the at least one industrial embedded system and transmits them to a remote computer 505; the control commands 506 are transmitted from the remote computer 505 to the router 550. The industrial embedded system 502 further includes a memory module 530 coupled to the video processing module 510.

Referring to FIG. 5, in one embodiment, the industrial embedded system 502 may be previously mentioned industrial computer, industrial controller, embedded industrial computer, embedded industrial controller, programmable logic controller (PLC), programmable automation controller (PAC), or another industrial level controller or industrial level embedded system for various production apparatus or testing apparatus of production lines, etc. The video processing module 510 of the industrial embedded system 502 receives the image signals 503 from the industrial embedded system 502. The image signals 503 from the industrial embedded system 502 may be directly transmitted to a display screen of a corresponding apparatus to be displayed; i.e., the image signals 503 generated by the industrial embedded system 502 may be signals of an image of operation, and such signals of image of operation is transmitted to a display screen to be displayed.

Referring to FIG. 5, in one embodiment, the control device 500 according to the embodiment performs control of images. After the video processing module 510 receives image signals 503, it processes the image signals 503, and transmits the image signal 503 to the remote control module 540 for image aggregation. The remote control module 540 here may be an Ethernet PHY. Via the router 550, the processed multiple image signals 503 are aggregated and transmitted to the remote computer 505 via the network. The router 550 can also transmit the processed multiple image signals 503 to another output 504 for display. It should be noted here that the term "router" is illustrative and not limiting; specifically, the router 550 may be a network router, switch, network switch, or any software and hardware-based device that has the function of a network router of any layer of the OSI model. Typically, the transmission network here may be the Ethernet, but it is not limited to such and may also be other wired or wireless networks typically used in industry or for general applications. Finally, the remote control module 540 transmits the processed image signals 530 to the remote computer 505. The remote computer 505 is the main control computer; it may be a desktop computer, notebook computer or tablet computer or other computer devices. It manages and controls the images of the industrial embedded systems via the control device 500.

Referring to FIG. 5, in one embodiment, the user may use the remote computer 505 to set control commands 506 and transmit them to the remote control module 540 of the industrial embedded system 502. The remote control module 540 may be an Ethernet PHY. Here, control commands 506 typically refer to any expressions of executable programs used in industrial production, and include all programing languages or compiled machine languages, which can be executed by the industrial embedded systems 502 or the industrial control systems, industrial controllers, and industrial computers to perform intended functions. The remote control module 540 of the industrial embedded system 502 is coupled to the control processing module 520. The control processing module is a module that includes processors, for receiving and processing control command 506. As explained above, under this framework, the user may use the control device 500 to accomplish the function of controlling the industrial embedded systems 502. As for the processing of images and transmission of control commands, those skilled in the art may refer to the above descriptions of the third and fourth embodiments, and use similar or the same components to implement the framework of image processing and control command transmission.

Referring to FIG. 5, in one embodiment, the control device 500 further includes a control processing module 520 controlling the video processing module 510, i.e., after the control commands 506 from the remote computer 505 are transmitted to the control processing module 520, they can be used to control the video processing module 510 to perform image processing. Take the example of adjusting resolution, the image seen at the remote computer 505 may be one that has been aggregated by the router 550 and displayed as a multi-image display having multiple images arranged in a grid. The low resolution and compression of the images make them suitable for one small image of the multi-image display, but when the user of the remote computer 505 discovers that the image corresponding to one of the industrial embedded systems 502 indicates abnormality, the user may select a control command 606 and transmit it to the control device 500, to adjust the image resolution and transmit the new image to the remote computer 505. This way, the user of the remote computer 505 can enlarge that image so that the user can observe the image more easily, more clearly and with more details.

Sixth Embodiment

Figure 6:
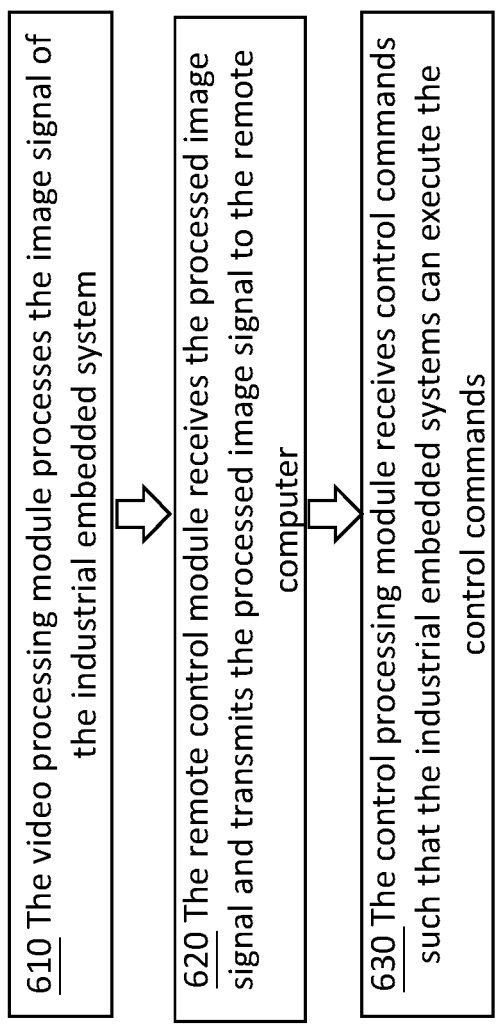
FIG. 6 illustrates a process flow of an image control device for industrial embedded systems according to an embodiment of the present invention.

FIG. 6 illustrates a process flow of an image control device for industrial embedded systems according to an embodiment of the present invention. The process flow described here provides an example of the various steps. Although the process steps are described in a particular sequence and order, unless otherwise specified, the order of the process steps may be changed. Thus, the process flow described here is only an example, and the process flow may be executed in different orders of the steps, and some steps may be executed concurrently. In addition, not all implementations include the same steps, so some embodiments may omit one or more of the steps. The invention also covers other process flows. The method 600 may be performed by device 100 or system 500; the descriptions below use the device 100 to perform the steps, and also refer to FIGS. 1-4, as well as system 500 when necessary.

In step 610, referring to FIG. 1 and FIG. 6, in one embodiment, the industrial embedded system 102 may be an industrial computer, industrial controller, embedded industrial computer, embedded industrial controller, programmable logic controller (PLC), programmable automation controller (PAC), or another industrial level controller or industrial level embedded system for various production apparatus or testing apparatus of production lines, etc. as described earlier. The video processing module 110 of the control device 100 receives the image signal 103 generated by the industrial embedded system 102. The image signal 103 generated by the industrial embedded system 102 can be directly transmitted to the display screens of the corresponding apparatus to be displayed. I.e., the image signal 103 generated by the industrial embedded system 102 may be a signal of an image of operation, and the signal of the image of the operation is transmitted to a display screen to be displayed.

In step 610, referring to FIG. 3 and FIG. 6, the video processing module 310 processes the image signal 303 of the industrial embedded system 302. In one embodiment, the industrial embedded system 302 transmits the image signal 303 to the buffer 312 of the video processing module 310. Having passed through the buffer 312, the image signal 303 can be directly output to the output 304 used by or corresponding to the industrial embedded system 302, such as a display panel, LCD screen or touch panel display. It should be noted that the image signal 303 directly output from the buffer 312 has not been image processed, i.e., using the control device 300 of this embodiment, the industrial embedded system 302 still maintains the original transmission path of its output, to display the image on its corresponding display device. Preferably or simultaneously, the image signal 303 having passed though the buffer 312 can be transmitted to the video capture device 314 and the video scaler 316.

In step 610, referring to FIG. 3 and FIG. 6, the processing of the image signal 303 by the industrial embedded system 302 of the video processing module 310 may include the following steps: performing timing adjustment and resolution adjustment, and outputting a standard image signal to achieve the function of image expansion. Examples of the standard image signal include VGA, DVI, HDMI, etc. The image signal 303 is processed by the video capture device 314, where the video capture device 314 captures the image signal 303. After the video capture device 314 captures the video signal 303, the video scaler 316 is used to adjust the resolution of the processed video signal 303. The video scaler 316 is used to change the resolution to achieve resolution adjustment, such as adjusting the horizontal resolution or the vertical resolution. Typically the resolution is changed from a lower resolution to a higher resolution, or from a higher resolution to a lower resolution, so here the video scaler may be considered a video resolution adjusting device or video amplifier.

In step 610, referring to FIG. 3 and FIG. 6, after processing by the video capture device 314 and the video scaler 316, the image signal 303 can now be output. A digital to analog converter (DAC) (which may be an external DAC) can be used to covert the digital signal to analog signal, to produce a standard image signal to be transmitted to the output 304, such as a display panel, LCD screen or touch screen display, to achieve the function of image expansion. For example, the working image or processed image frame of the industrial embedded system 302 can be displayed on multiple display devices or transmitted to the remote end via the network, so that multiple users may simultaneously monitor the industrial embedded system 302.

In step 610, referring to FIG. 3 and FIG. 6, in one embodiment, preferably or simultaneously, the image signal 303, after being processed by the video capture device 314 and the video scaler 316, can be simultaneously or selectively output as expanded images, and the image signal 303 can be transmitted to the video compression engine 318. This embodiment has the effect of centralized control of multiple industrial embedded systems 302, so it is important to reduce the image transmission burden of each image; thus, by using the video compression engine 318 to compress the image signals 303, thereby reducing the amount of data to be transmitted, the burden on the transmission bandwidth of the network can be reduced.

In step 620, referring to FIG. 3 and FIG. 6, the remote module receives the processed image signal and transmits it to the remote computer 305. In one embodiment, after the video compression engine 318 processes the image signal 303, the processed image signal 303 is transmitted by the video processing module 310 to the remote control module 340, and then via the network, the image signal 303 is transmitted to the remote computer 305. Here, the transmission network may be the Ethernet, but is not limited to such, and can also be any wired or wireless network commonly used in industry or general applications. The remote computer 305 is the main control computer; it may be a desktop computer, notebook computer or tablet computer or other computing devices. As explained above, the remote computer 305 can centrally manage image signals 303 from multiple industrial embedded systems 302 via the control device 300, so that under the framework of conventional industrial systems and other industrial control systems, the function of providing image management using the network (video over IP) is realized.

In step 620, referring to FIG. 3 and FIG. 6, in one embodiment, after the video compression engine 318 processes the image signal 303, the processed image signal 303 is output by the video processing module 310 and transmitted by the remote control module 340 to the router 350, and then via the network, the image signal 303 is transmitted to the remote computer 305. Here, the transmission network may be the Ethernet, but is not limited to such, and can also be any wired or wireless network commonly used in industry or general applications. It should be noted that here the term "router" is used broadly without limitation; the router 350 may be a network router, switch, network switch, or any software and hardware-based device that has the function of a network router of any layer of the OSI model. Using the router 350, the multiple processed image signals 303 from multiple industrial embedded systems 302 may be transmitted to the remote computer 305 by the control device 300.

In step 630, referring to FIG. 4 and FIG. 6, in one embodiment, the control processing module receives control commands such that the industrial embedded systems can execute the control commands. The user may use the remote computer 405 to set control commands 406 and transmit them to the remote control module 440 of the control device 400. Here, control commands 406 typically refer to any expressions of executable programs used in industrial production, and include all programing languages or compiled machine languages, which can be executed by the industrial embedded systems 402 or the industrial control systems, industrial controllers, and industrial computers to perform intended functions. The remote control module 440 of the control device 400 is coupled to the control processing module 420, and can transmit control commands 406 to the control processing module 420 via the network. The transmission network may be, without limitation, the Ethernet, but it may also be other wired or wireless networks typically used in industry or for general applications. The control module is a module that includes a processor, such as a CPU; it is used to receive and process control commands 406 and then transmits them to control units of the industrial embedded systems 402 to execute various control processes. As explained above, under this framework, the user may use the control processing module 420 to accomplish the function of controlling the industrial embedded systems 402.

In step 630, referring to FIG. 2 and FIG. 6, after the control commands 206 transmitted back from the remote computer 205 is transmitted to the control processing module 220, it can be further used to control the video processing module 210 to perform image processing. Take the example of adjusting resolution, the image seen at the remote computer 205 may be one that has been aggregated by the router and displayed as a multi-image display having multiple images arranged in a grid. The low resolution and compression of the images make them suitable for one small image of the multi-image display, but when the user of the remote computer 205 discovers that the image corresponding to one of the industrial embedded systems 202 indicates abnormality, the user may select a control command 206 and transmits it to the control device 200, to command the latter to adjust the image resolution and transmits the new image to the remote computer 205. This way, the user of the remote computer 205 can enlarge that image so that the user can observe the image more easily, more clearly and with more details.

In above embodiments of the present invention, the various modules are implemented in electrical circuits, including logic circuits, processors with associated memory storing program instructions, etc.

The descriptions above are provided for explanatory purposes, and the various specific details are provided for a thorough understanding of the invention. Those skilled in the relevant art will be able to implement this invention without certain specific details. In other embodiment, some well-known structures and devices are not shown in the block diagrams. Between various elements shown in the drawings, intermediate structures may be present. The various described elements may include additional inputs and outputs, even though they are not shown in detail in the drawings.

In the various embodiments, certain elements are shown as separate circuits, but some or all elements may be integrated into one circuit. Thus, each of the various elements recited in the appended claims may correspond to one or more circuits.

Embodiments of the present invention include various processing programs, which may be embedded in hard drives or other computer readable memory and executed by processors. The processors may be general or special purpose processors or logic circuit that can execute program instructions, which execute the programs. The various components of the embodiments may also be combinations of hardware and software.

Other aspects of the present invention provide computer program products, including a computer usable non-transitory medium having a computer readable program code embedded therein, where the program can be executed by processors or other electronic components to perform the methods described above. The computer usable non-transitory medium may include, without limitation, magnetic disks, optical discs, CD-ROMs, ROMs, RAMs, EPROMs, EEPROMs, magnetic memory, optical card, flash memory, or other computer usable medium suitable for writing and reading programs. Further, the computer program products according to embodiments of the present invention may also be downloadable programs which may be transmitted from a remote computer to a specified computer.

In the various methods described above, steps may be added or removed without departing from the spirit of the invention. Those skilled in the art can further improve the various embodiments. The embodiments described above are for explanation only and are not limiting.

In the above descriptions, when it is said that "component A is connected (or coupled) to component B", component A may be directly connected (or coupled) to B, or indirectly connected (or coupled) to B via component C. When it is said that a component, characteristics, structure, process or property A causes a component, characteristics, structure, process or property B, it is meant that A is at least a part of the cause of B, and other component, characteristics, structure, process or property may also help to cause B. When the word "may" is used, the component, characteristics, structure, process or property is not limited to what is described. Further, the number of various items describes in the specification is not limited to one.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. An image control system, comprising:
 a router;
 a plurality of industrial embedded systems;
 a plurality of control devices, each being coupled to the router and to a corresponding one of the plurality of industrial embedded systems;
 each control device comprising:
  a video processing module, for processing an image signal generated by the corresponding industrial embedded system;
  a remote control module, coupled to the video processing module, for receiving processed image signal and transmitting the processed image signal to the router, wherein the remote control module further receives a control command from the router; and
  a control processing module, coupled to the remote control module, for receiving and processing the control command and controlling the video processing module based on the control command;
 wherein the router aggregates the processed image signals from the remote control modules of the plurality of control devices to form an aggregated image signal containing a plurality of images corresponding to the plurality of industrial embedded systems, the plurality of images being arranged in a pattern of a multi-image display, and transmits the aggregated image signal to a remote computer via a communication network,
 wherein the control command, which has been generated by the remote computer based on the aggregated image signal, is transmitted from the remote computer to the router via the communication network, wherein the control command requests a change in image resolution corresponding to a selected one of the industrial embedded systems,
 wherein in response to the control command, the control device corresponding to the selected industrial embedded system increases an image resolution of the processed image signal, and the router transmits the processed image signal having the increased image resolution to the remote computer via the communication network, and
 wherein the router and the plurality of control devices, including the video processing module, the remote control module and the control processing module of each control device, communicate with each other without passing through the communication network.

2. The image control system of claim 1, wherein the video processing module of each control device includes a video capture device and a video scaler, for performing timing adjustment and resolution adjustment of the image signal.

3. The image control system of claim 1, wherein the video processing module of each control device includes a video compression engine for compressing the image signal.

4. The image control system of claim 2, wherein each control device further comprises a digital to analog converter, wherein after at least one of resolution and timing is adjusted by the video capture device and the video scaler, the digital to analog converter converts the adjusted image signal and outputs a standard image signal to achieve image expansion.

5. The image control system of claim 1, wherein each control device further comprises a memory module for storing the processed image signal, the memory module including at least one memory controller and a memory, for storing setting commands for image processing and image processing results.

6. The image control system of claim 1, wherein the router is a network router.

7. The image control system of claim 1, wherein the image signal generated by each industrial embedded system is a signal of an operation screen, and wherein the signal of the operation screen is transmitted to a display panel.

8. The image control system of claim 1, wherein in each control device, the control processing module controls the video processing module.

9. An image control method for industrial embedded systems, implemented in a router and a plurality of control devices, each control device being coupled to the router and to a corresponding industrial embedded system, the method comprising:
   by a video processing module of each control device, processing an image signal generated by the corresponding industrial embedded system and transmitting the processed image signal to a remote control module of the control device without passing through a communication network;
   by the remote control module of each control device, receiving the processed image signal, and transmitting the processed image signal to the router without passing through a communication network;
   by the router, aggregating the processed image signals from the remote control modules of the plurality of control devices to form an aggregated image signal containing a plurality of images corresponding to the plurality of industrial embedded systems, the plurality of images being arranged in a pattern of a multi-image display, and transmitting the aggregated image signal to a remote computer via a communication network;
   by the router, receiving a control command, which has been generated by the remote computer based on the aggregated image signal, from the remote computer via the communication network, wherein the control command requests a change in image resolution corresponding to a selected one of the industrial embedded systems;
   by the remote control module of the control device corresponding to the selected industrial embedded system, receiving the control command from the router and transmitting the control command to the control processing module of the control device without passing through the communication network;
   by a control processing module of the control device corresponding to the selected industrial embedded system, receiving the control command from the remote control module and controlling the video processing module of the control device based on the received control command to increase an image resolution of the processed image signal corresponding to the selected industrial embedded system;
   by the remote control module of the control device corresponding to the selected industrial embedded system, receiving the processed image signal having the increased image resolution and transmitting the processed image signal to the router; and
   by the router, transmitting the processed image signal having the increased image resolution to the remote computer via the communication network.

10. The image control method for industrial embedded systems of claim 9, wherein the step of processing the image signal by the video processing module of each control device includes: performing timing adjustment and resolution adjustment of the image signal.

11. The image control method for industrial embedded systems of claim 9, wherein the step of processing the image signal by the video processing module of each control device includes: compressing the image signal.

12. The image control method for industrial embedded systems of claim 9, further comprising: after the video processing module of each control device processes the image signal, outputting a standard image signal to achieve image expansion.

13. The image control method for industrial embedded systems of claim 9, wherein the image signal generated by each of the industrial embedded systems is a signal of an operation screen, the method further comprising: by the video processing module, transmitting the signal of the operation screen to a display panel.

* * * * *